United States Patent [19]

Madsen

[11] 4,389,423

[45] Jun. 21, 1983

[54] PROCESS FOR THE PRODUCTION OF POWDERED PROTEIN MATERIALS FROM ANIMAL RAW MATERIAL

[75] Inventor: Tonni B. Madsen, Fredericia, Denmark

[73] Assignee: Danske Andelsslagteriers Kodfoder-og Albuminfabrik, Lunderskov, Denmark

[21] Appl. No.: 224,929

[22] Filed: Jan. 14, 1981

[30] Foreign Application Priority Data

Jan. 31, 1980 [DK] Denmark .................................. 80406

[51] Int. Cl.$^3$ ............................................. A23J 1/10
[52] U.S. Cl. .................................. 426/417; 426/480; 426/490; 426/657; 260/112 R; 260/412.6
[58] Field of Search ............... 426/417, 480, 422, 495, 426/657; 260/112 R, 412.6

[56] References Cited

U.S. PATENT DOCUMENTS

| | | | |
|---|---|---|---|
| 2,193,871 | 3/1940 | Hanno | 426/417 |
| 2,832,684 | 4/1958 | Sirnes | 426/417 |
| 3,114,638 | 12/1963 | Huhn et al. | 426/417 |
| 3,497,364 | 2/1970 | Overton | 99/235 |
| 3,586,515 | 6/1971 | Anderson | 426/417 |
| 4,137,335 | 1/1979 | Holm et al. | 426/417 |

FOREIGN PATENT DOCUMENTS 2802271 8/1978 Fed. Rep. of Germany ...... 426/480

*Primary Examiner*—Robert A. Yoncoskie
*Attorney, Agent, or Firm*—Fleit, Jacobson & Cohn

[57] ABSTRACT

Two powdered protein products are produced from animal raw material of varying composition, in particular offal from bacon factories and cattle slaughterhouses.

The offal is heat treated and separated mechanically into a fluid phase and a solid phase, which is powder-dried with subsequent removal of bone pieces to obtain the first protein powder. The fluid phase is separated into a sludge which is returned into the process, into a fat phase—which is processed into technical fat and into a size phase which is spray-dried separately in order to obtain the second protein powder. The powders produced are free flowing without any lumping tendency. The first powder has a protein content which corresponds to the content of conventionally produced meatbone meal, whereas the second powder has a high protein content and has gluing properties and may therefore be used as a gluing agent or as a protein supplement for fodder.

7 Claims, No Drawings

PROCESS FOR THE PRODUCTION OF POWDERED PROTEIN MATERIALS FROM ANIMAL RAW MATERIAL

The present invention relates to a process and an apparatus for the production of powdered protein materials from animal raw material, especially offal, such as industrial fish and slaughter offal, in particular offal from bacon factories and cattle slaughterhouses.

Offal from bacon factories and cattle slaughterhouses is generally processed at the meat meal factories into technical fat and meat-bone meal, which is an important protein supplement for fodder. In the so-called dry-rendering process offal is heat treated to form a fluid mixture consisting of meat particles, bone pieces, size and liquid fat. Next the mixture is separated mechanically into a moist meat-bone fraction, a size fraction and a fat fraction. The size fraction is returned into the process or concentrated into a syrup which is then mixed with the meat-bone fraction. This combined meat-bone fraction is dried and ground into meat-bone meal. The fat fraction is processed into technical fat.

Norwegian Pat. No. 139,627 describes a process in which the meat-bone fraction and the size fraction are each dried into a low protein and a high protein meal, respectively. The high protein meal is produced from the liquid, remaining after the removal of the meat-bone meal from the heat treated offal. The liquid is separated into a sludge phase, an aqueous phase and a fat phase, and the aqueous phase is concentrated and separated into a second fat phase and a second sludge phase which combined with the first sludge phase is dried until the high protein meat meal is obtained.

For economic reasons the plant has to process all available slaughter offal which may consist of viscera, bone, cartilage and perhaps dead animals. The variation in the raw materials produces certain difficulties in controlling the process and is often resulting in final products diverging with respect to quality e.g. a variation of the protein content, caused by the limited possibility of adapting the process to the variety of the raw material.

By sorting and mixing of the offal these drawbacks may be partly eliminated but the work connected with this is seldom economically worthwhile.

The object of the present invention is to provide a process for the production of powdered protein materials from animal raw material, especially offal, being of the kind in which the material is to be heat treated and separated mechanically into a moist meat-bone fraction and a size fraction which is to be dried as well as a fat fraction which is processed into a technical fat, but wherein the process is less sensitive than the known processes with respect to inevitable variations of the supplied animal raw material and in which process two powdered protein products are produced. One of these will have a protein content sufficiently high for utilisation as such as a conventional meat-bone meal while the other one will have a considerably higher protein content with a larger share of digestible protein—compared with the known products—and with advantageous glue properties. Thus, it may be used as a high protein fodder supplement equal to blood meal.

The object is fulfilled by the process according to the invention which is characterized in that (i) the animal raw material is minced or ground and hereafter heat treated, preferably under release of steam, (ii) bone and meal are mechanically separated from the heat treated material and powder dried with subsequent removal of bone pieces in order to obtain a first protein powder.

(iii) the fluid phase obtained is separated into a sludge which is returned into the process—and into a fat phase—which in a purification step is processed into technical fat—and into an aqueous size phase and (iv) the size phase is spray-dried separately in order to achieve a second protein powder.

By the use of the process according to the invention a considerably less problematic dehydration of the protein fractions is achieved compared with the above mentioned known processes, due to the independence of the variety of the raw material, resulting in the first place in products whose colour, protein and powder properties are more constant than those achieved by the known processes.

Furthermore, the problems associated with these processes as to lump and glue effects during the dehydration are mainly avoided resulting in energy savings together with less meat strain of the proteins. For instance by the process of the invention it is possible to dry the generally strongly gluing and lumping size without damage to the content of the protein solids. This will not be possible with the sludge fractions dehydrated according to the Norwegian Patent Specification because the gluing mass formed during the dehydration is by necessity overheated in a disc dryer in order to eliminate the remaining water.

Previously the fish meal industry experimented with the spray-drying of conventionally produced fish size. The experiment failed, however. Therefore, it is surprising that by the process according to the invention it has been possible to apply spray-drying and in addition to obtain an easy-handled powder.

Regardless of the fact that the process of the present invention has substantial advantages the necessary equipment used is not substantially larger than with the corresponding known processes and in addition all the equipment is commercially available.

The process according to the invention results in four products which are all commercially valuable i.e. there is no less of usable materials and no additional pollution of the waste waters. The bone pieces of step (i) which are easy to remove, contain mainly calcium compounds and may be used after grinding as a fodder supplement, e.g. for pet-food or as a fertilizer.

The protein powder obtained by the process according to step (ii) contains about 42-47 percentage by weight of raw protein when using raw materials coming from bacon factories or cattle slaughterhouses. This percentage corresponds to the protein content of ordinary meat-bone meal but in addition it has a far lesser content of ashes than is the case in the Norwegian Patent No. 139,627. It may be used in the same way as usual meat-bone meal.

The size powder produced by the process is most valuable, containing over 70 and up to 80 percentage by weight of digestible raw protein. Thus, it may be sold as a substitute for blood meal and fish meal. Furthermore, it is usable as a glue when moistened with water. When fodder is to be used in pelleted or in a suspended form, e.g. for feeding minks or trout, the size powder produced by the process according to the invention may be advantageously added as a combined protein supplement and a gluing agent resulting in producing at the same time a nourishing supplement and a gluing or thickening effect. In this way the application of glues without any fodder value, e.g. lignin sulphonates may be avoided.

The three powder products obtained i.e. bone powder, meat meal powder and size powder, may be mixed in arbitrary proportions in order to obtain powder products with a desired content of protein, etc.

Therefore, it is possible currently to mix a meat-bone meal that very accurately observes the predetermined protein content of standard meat-bone meal without having to resort to the storage of a large variety of meat meals.

If desired, the bone powder may be completely left out from such a mixture obtaining a mixed product with a higher protein content than meat-bone meal used sofar.

The purified fat products obtained by the process according to the invention does not differ from the technical fat now commercially sold.

The individual steps of the process may be carried out as follows:

In step (i) animal raw material is preferably minced or ground to a maximum particle size of about 70 mm forming a fluid mixture which may be easily transported and heat treated. The heat treatment may be performed in the usual way e.g. at a temperature of 125° C. under pressure, and the water content may be regulated by releasing steam during the process step. Step (ii) consists preferably of two separation steps for the heat treated material, viz. a first separation step whereby bone in the form of pieces or lumps is separated and a second separation step whereby meal in the form of bone and meat meals is separated. The solid fractions thus achieved are combined and powderdried with subsequent removal of bone yielding the first protein powder. The equipment used in the separation steps consists preferably of a sediment tank, respectively a decanter (centrifuge).

By the two steps' separation a more sludgefree fluid phase is obtained from the decanter, because it is not loaded with bone pieces making the mixture less flowing. The combined bone and meat fraction is fed to a dryer e.g. a disc dryer where it is freed from water. The dried product is easily crumbled and may thus be separated wholly or partly by means of a screen into bone pieces and meat-bone meal.

In step (iii) the fluid phase of step (ii) is separated into its three ingredients i.e. fat, size and sludge. A high separation is obtained when step (iii) comprises (a) a first separation into a sludge which is returned into the process, a fat phase which in a purification step is processed into technical fat and an aqueous size phase, (b) a concentration of the aqueous size phase under release of steam and (c) a second separation into a sludge which is returned into the process, and into a fat phase which is processed in the same purification step as the fat obtained under (a) and a size phase with a reduced fat-. slurry- and water content.

The equipment used may consist of a sludge discharging centrifuge, a vacuum evaporator and another sludge discharging centrifuge. The sludge of step (a) is preferably fed back into the heat treating process, because it contains proportionally much rough material, whereas the sludge coming from step (c) is fed back to the fluid phase obtained by the separation of step (ii), since it does not substantially affect the subsequent separation steps.

The fat of step (iii) is preferably collected in a fat tank and purified in the usual way, e.g. in a polishing centrifuge. The size coming from the fat purification step is preferably led to the aqueous size phase obtained in step (b) because it has a low sludge content.

In step (iv) the size previously freed from fat, sludge and possibly some water is spray-dried e.g. in an ordinary spray-dryer with an air flow. The size is dried to fine particles which in the form of a protein powder may be chilled and transported from the bottom of the dryer to storage by means of a cold air flow.

The process according to the invention may be performed in an apparatus which is made from commonly known equipment components.

According to the invention an apparatus preferably comprises a dry-melting tank and a separation unit connected to the tank with one or more outlets for bone and meals, the outlet(s) being connected to a powder-dryer with a subsequent screen for the separation of bone pieces and an outlet for the fluid phase, a separation- and purification system connected to the latter outlet which system contains a first centrifuge with a sludge outlet, a fat outlet connected to a fat purification system and a size outlet connected to an evaporator and a second centrifuge connected to the outlet of the evaporator, which centrifuge has a sludge outlet, a fat outlet and a size outlet connected to a spray-dryer.

The apparatus according to the invention is preferably so constructed that the sludge outlet on the first centrifuge of the separation- and purification system is returned to the dry-melting tank. A suitable feature of the apparatus according to the invention is that the sludge outlet on the second centrifuge is returned to the inlet of the first centrifuge.

From the fat purification system some size is obtained which is so pure that it is unnecessary to lead it through the entire process once more. Accordingly, in an advantageous embodiment of the apparatus of the invention the size outlet of the fat purification system leads to the inlet of the evaporator.

By a special embodiment of the separation unit an improved separation between the solid and the fluid phase is obtained and thus an improved treatment of each of the phases. The apparatus of the construction is characteristic in that the separation unit comprises a sediment tank with a lower outlet for a bone fraction in the form of pieces and lumps and an upper outlet for fluid containing meat particles and a decanter connected to the fluid outlet in the form of a centrifuge with an outlet for solids and an outlet for the fluid phase, the solid outlet and bone outlet from the sediment tank being connected to the inlet of the powder-dryer.

The process and apparatus according to the invention are described further in the following example. 3 tons of offal from a bacon factory being minced or ground to a maximum particle size of about 70 mm and containing about 50 percentage by weight of cartilage and bone are led to a dry-melting tank. The content is heated to 125° C. during 15 minutes under pressure and removal of about 200 kgs steam, whereafter the entire content is led to a storage container. From the container a continuous flow of fluid mixture is led to a sediment tank at a speed of about 13.9 t/h. Here a bone fraction (at a rate of about 1 t/h) is separated. From the tank the mixture freed from bone pieces is led further to a decanter, where a moist meal fraction (at about 4.3 t/h) and a fluid fraction (at about 8.6 t/h) are continuously discharged. The meal fraction is mixed with the bone fraction forming a product containing about 45 percentage by weight of free water and is further treated as described beneath.

The 90°–100° C. hot fluid fraction is separated in a first disc centrifuge into a sludge fraction (at about 0.9 t/h) which is returned to the dry-melting tank, a fat fraction (at about 1.2 t/h) which is led to a fat storage tank for further purification and processing into technical fat, and a size fraction (at about 6.5 t/h) which is led to a size storage tank which also receives size from the fat processing equipment.

From the size storage tank some size might be returned to the buffer container to achieve a suitable liquid consistency of the heat treated offal. However, in general the size is led (at a rate of 6.5 t/h) to a two-step vacuum evaporator, where it is concentrated to half the volume. In this way a material of a consistency as syrup is obtained.

In a second disc centrifuge this "syrup" is freed from fat (0.2 t/h)—which is led to the fat storage tank—and sludge (0.3 t/h) led to the inlet of the first disc centrifuge and spray-dried at about 80° C. in a spray chamber by means of air heated to 200°–300° C.

After chilling to 35°–40° C. a light weight flowable powder in a quantity of 1.1. t/h is obtained, having a specific weight of 0.3–0.5 g/cm$^3$ and containing 70–75 percentage by weight of digestible raw protein and less than 10 percentage by weight of water. On moistening with water and powder attains excellent gluing properties.

The obtained moist meat-bone fraction is dried in a disc dryer. About 3.1 t/h of powder is discharged from the disc dryer containing larger and smaller bone pieces. The bone pieces are sorted out by a vibrating screen.

The separated meal powder obtained has a desirable light colour and is easy to handle and has no lumping tendency. It contains 42–47 percentage by weight of raw protein. The separated bone pieces are ground to a calcium rich bone powder.

What we claim is:

1. A process for the production of protein products from bone containing animal raw material comprising:
    (a) grinding the bone containing animal raw material,
    (b) heat treating the ground animal raw material at a temperature above 100° C. in order to obtain a mixture consisting of solids in a fluid phase,
    (c) mechanically separating said mixture in order to produce a fluid phase, and a moist protein-containing bone/meal fraction,
    (d) drying the moist bone/meal fraction,
    (e) separating the dried bone/meal fraction into a first protein product containing bone pieces and a second powdered protein product,
    (f) separating said fluid phase into a sludge, an aqueous protein phase and a fat containing phase,
    (g) returning the sludge to step (b) or step (c),
    (h) passing the fat containing phase on to a fat purification apparatus, and
    (i) spray-drying the protein phase separately in order to produce a third powdered protein product.

2. A process for the production of protein containing products from bone containing animal raw material, comprising:
    (a) grinding the bone containing animal raw material,
    (b) heat treating the ground animal raw material at a temperature above 100° C. in order to obtain a mixture consisting of solids in a fluid phase,
    (c) mechanically separating said mixture in order to produce a fluid phase and a moist protein-containing bone/meal fraction,
    (d) drying the moist bone/meal fraction,
    (e) separating the dried meal fraction into a first protein product containing bone pieces and a second powdered protein product,
    (f) separating said fluid phase into a sludge, an aqueous protein phase and a fat containing phase,
    (g) returning the the sludge to step (b) or step (c),
    (h) passing the fat containing phase on to a fat purification apparatus,
    (i) concentrating the aqueous protein phase obtained by step (f) by removal of water by vaporization,
    (j) separating the concentrate in order to obtain a second sludge, a second fat containing phase and a purified concentrated protein phase,
    (k) returning the second sludge to step (b) or step (c),
    (l) passing the second fat containing phase on to the fat purification apparatus, and
    (m) spray-drying the concentrated protein phase separately in order to produce a third powdered protein product.

3. A process according to claim 2, wherein the sludge of step (g) is passed on to the heat treating process step (b).

4. A process according to claims 2 or 3, wherein the sludge of step (k) is passed on to the fluid phase obtained by the separation of step (c).

5. A process according to claim 2, wherein a protein obtained in the fat purification step (h) is fed to the aqueous protein phase obtained by process step (f).

6. A process according to claims 1, 2, 3, or 5, wherein the bone containing animal raw material is ground to a maximum particle size of about 70 mm.

7. A process according to claim 1 or 2, wherein step (c) comprises: a first separation step in which the heat treated material is separated into a fraction containing bone pieces and a solid-containing fluid fraction followed by a second separation step in which the solid-fluid fraction is separated into said fluid phase and a bone-meat meal, and a mixing step in which the bone-meat meal is combined with the fraction containing bone pieces into said moist bone/meal fraction.

* * * * *